United States Patent [19]

Mathisson et al.

[11] Patent Number: 4,584,465

[45] Date of Patent: Apr. 22, 1986

[54] METHOD AND APPARATUS FOR HEATING PROCESS AIR FOR INDUSTRIAL PURPOSES

[75] Inventors: Goran Mathisson; Sven Santen, both of Hofors, Sweden

[73] Assignee: Skf Steel Engineering AB, Hofors, Sweden

[21] Appl. No.: 479,944

[22] Filed: Mar. 29, 1983

Related U.S. Application Data

[63] Continuation-in-part of Ser. No. 343,497, Jan. 28, 1982, abandoned.

[30] Foreign Application Priority Data

Oct. 22, 1981 [SE] Sweden .............................. 8106242

[51] Int. Cl.$^4$ ............................................... B23K 9/00
[52] U.S. Cl. .............................. 219/383; 219/121 PY; 219/121 PU; 423/235; 422/306
[58] Field of Search ...... 219/121 P, 121 PY, 121 PM, 219/121 PT, 121 PU, 383; 423/235, 235 D, 351; 422/305, 306

[56] References Cited

U.S. PATENT DOCUMENTS

| | | | |
|---|---|---|---|
| 3,838,193 | 9/1974 | Kajitani et al. ................. | 423/235 D |
| 3,911,083 | 10/1975 | Reed et al. ...................... | 423/235 D |
| 4,056,704 | 11/1977 | Beach et al. ..................... | 219/121 P |
| 4,302,205 | 11/1981 | Muraki et al. ................... | 423/235 D |
| 4,316,878 | 2/1982 | Akune et al. .................... | 423/235 D |
| 4,350,669 | 9/1982 | Izumi et al. ..................... | 423/235 D |
| 4,469,508 | 9/1984 | Amouroux et al. ............. | 219/121 P |

*Primary Examiner*—M. H. Paschall
*Attorney, Agent, or Firm*—Armstrong, Nikaido, Marmelstein & Kubovcik

[57] ABSTRACT

A method and an apparatus are disclosed for heating process air for industrial purposes to a predetermined temperature. In one embodiment, the method comprises passing a first air-flow portion through a plasma generator and thus heating said portion to a temperature sufficiently high to cause the ionization of nitrogen and oxygen in the portion and thus form a plasma gas, immediately thereafter adding to said plasma gas a material containing carbon and/or hydrocarbon in sufficient quantity that when said material is reacted with the plasma gas, the ratio $CO + H_2/CO_2 + H_2O$ is at least 0.1 thereby substantially avoiding the formation of nitrogen oxide; and immediately thereafter mixing with the plasma gas, with its content of material containing carbon and/or hydrocarbon, a second air flow in such proportion that the predetermined temperature is achieved in the final air mixture. Alternatively, the plasma gas for heating the process air is generated by passing steam through a plasma generator without the addition of material containing carbon and/or hydrocarbon.

3 Claims, 4 Drawing Figures

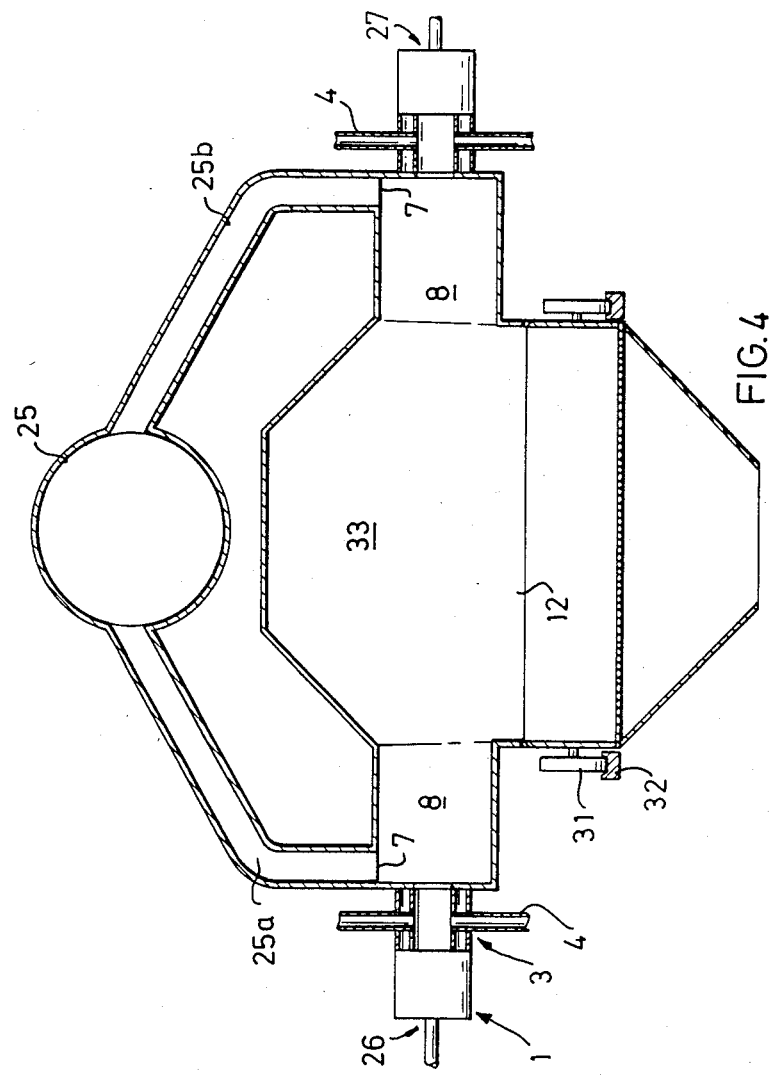

METHOD AND APPARATUS FOR HEATING PROCESS AIR FOR INDUSTRIAL PURPOSES

This application is a continuation-in-part of application Ser. No. 343,497, filed Jan. 28, 1982, and now abandoned.

BACKGROUND OF THE INVENTION

The present invention relates to a method and apparatus for heating process gases for industrial processes to a particular desired temperature. Process gas, particularly heated air, is used in considerable quantities in many industrial processes. Conventional methods of heating large volumes of gas, for example by means of heatexchangers, require considerable capital investment.

Recently, therefore, use is more and more frequently being made of the combustion of fossil fuels such as coal, coke, natural gas, oil, etc. Both from the environmental and the technical points of view, such combustion causes problems. From the environmental point of view, the discharge of sulphurous compounds results in the acidification of the environment and deposits of smoke and soot. Technical problems arise since sulphur may not be present in certain processes, such as various iron and steel manufacturing processes. Added to this are adverse cost factors since the prices of fossil fuel continue to rise substantially.

Various solutions to the above problems have been proposed. One method has been developed in the steel manufacturing field for increasing the temperature in the blast gas in a blast furnace, with the object of increasing production and at the same time reducing the coke consumption. In this known method, the blast gas is passed completely or partially through a plasma generated by means of an electric arc in a plasma generator of known type. The advantages with a plasma generator are its high degree of efficiency, reaching almost 90%, and that an extremely high temperature can be achieved, usually in excess of 3000° C.

In a plasma gas generated by a plasma generator, some of the atoms and molecules are ionized and these ionized particles are extremely reactive. When a plasma gas produced from an air-flow reverts to normal conditions at lower temperature, however, nitrogen oxides are obtained as well as nitrogen and oxygen. Nitrogen oxides are extremely toxic and give rise to the formation of nitric acid which can destroy the process equipment.

However, ih the above known method of heating the air blast for blast furnaces, the formation of nitrogen oxide has not been taken into consideration since the plasma gas generated is blown directly into the blast furnace where the nitrogen oxides are automatically broken down during their passage through the blast furnace charge. The use of a plasma generator for heating process gases is thus heretofore substantially limited to blast furnace applications.

BRIEF SUMMARY OF THE INVENTION

The object of the present invention is to eliminate the above disadvantages and achieve a method and apparatus permitting process air to be heated without becoming polluted and without nitrogen oxide being formed as described above, and which also results in cheaper heating in comparison with conventional heating using fossil fuels. This object is attained according to one embodiment of the invention by a process characterized in that a first air-flow portion is caused to pass a plasma generator and is thus heated to a high temperature. In order to avoid the formation of nitrogen oxide, a material containing carbon and/or hydrocarbon (e.g., in the form of oil, a coal slurry, natural gas, or coal powder) is added in such quantities to the plasma gas containing ionized nitrogen and oxygen that when said material has reacted with the plasma gas, the ratio $CO+H_2/CO_2+H_2O$ is at least 0.1. Thereafter, the heated plasma gas, with its content of material containing carbon and/or hydrocarbon, is immediately mixed with a second air-flow portion in such proportions that a predetermined desired temperature is achieved in the final air mixture.

Surprisingly, it has been found that in the conditions prevailing in the plasma gas, the oxygen reacts more quickly with carbon than with nitrogen, and that if the carbonaceous material is supplied to the plasma gas in such a quantity that the ratio $CO+H_2/CO_2+H_2O$ in the plasma gas after the reaction reaches at least 0.1, only negligible quantities of nitrogen oxides are formed. The quantity of carbonaceous material to be added can be determined by observing the prevailing material balances when the volumes of air entering and leaving and the temperature are known.

The invention also relates to an apparatus for heating a process gas to a predetermined desired temperature, comprising a plasma generator for generating a plasma gas by means of an electric arc, an inlet for a first airflow to form the plasma gas, and an inlet for the second air-flow to be heated by the plasma gas. This apparatus is substantially characterized by a tuyere within the area where the plasma gas leaves the plasma generator, lances for the supply of material containing carbon and/or hydrocarbon into the plasma gas, and a reaction zone located immediately after the tuyere. The inlet for the second air-flow to be heated by the plasma gas opens into the reaction zone.

The plasma gas is preferably caused to rotate in the plasma generator in order to reduce the electrode wear. According to a preferred embodiment of the invention, the tuyere is provided with tangential inlets for the material containing carbon and/or hydrocarbon, the inlets being so directed that the carbonaceous material is caused to rotate in a direction opposite to the direction of rotation of the plasma gas. Thorough mixing is thus achieved and the reaction conditions are thereby rendered more favorable.

In another embodiment of the invention, a small stream of a gas which is devoid of any free oxygen and nitrogen, say steam, is heated in plasma generator means and the heated plasma gas is mixed with the main process stream to heat the latter to a predetermined temperature. In this way, the formation of nitrogen oxides can be avoided without mixing carbon and/or hydrocarbon-containing material into the resulting plasma gas produced by heating part of the process stream in plasma generator means. The invention also contemplates the provision of apparatus for practicing this modified process.

BRIEF DESCRIPTION OF THE DRAWINGS

For a better understanding of the invention, reference may be made to the following description of an exemplary embodiment taken in conjunction with the figures of the accompanying drawings, in which:

FIG. 4 is a section through the line IV—IV through the means according to FIG. 3.

DESCRIPTION OF THE PREFERRED EMBODIMENT

Figure 1:
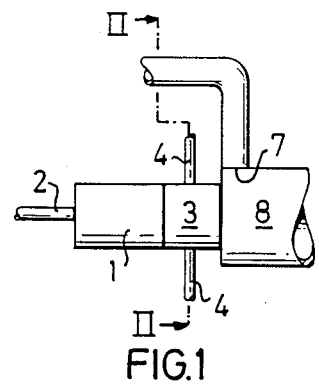
FIG. 1 is a schematic view of a plasma generator according to the invention.

Referring to FIG. 1, there is shown schematically a plasma generator designated 1. The plasma generator 1 is provided with an inlet duct 2 for a first air-flow portion which is to be heated. This air-flow may consist partially or completely of recycled air used earlier in the same process, for instance cooling air or the like. When the air passes the electric arc generated in the plasma generator, it achieves plasma state and "plasma gas" is formed. Immediately following the plasma generator, seen in the direction of flow of the air, is a water-cooled tuyere 3 with lances 4 for the supply of material containing carbon and/or hydrocarbon and possibly water to prevent the formation of nitrogen oxides which would otherwise unavoidably occur. The second air-flow portion is supplied through inlet 7 immediately after the tuyere to the extremely hot plasma gas. The orifice of inlet 7 opens into what can be termed a mixing or reaction zone 8.

Figure 2:
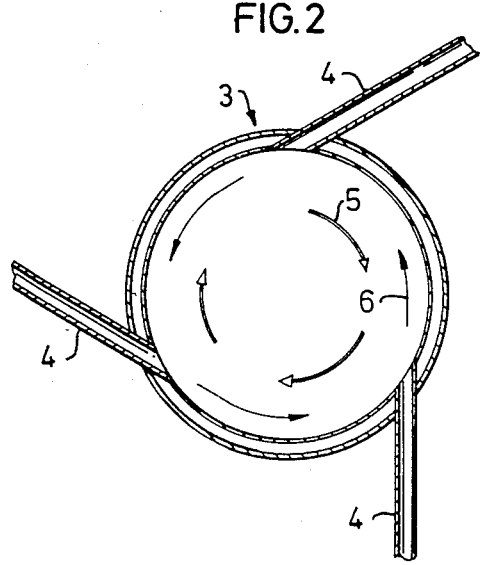
FIG. 2 is a section through the line II—II in FIG. 1 showing the water-cooled tuyere.

FIG. 2 shows a cross-section along the line II—II in FIG. 1 through the tuyere for the supply of material containing carbon and/or hydrocarbon to the plasma gas. As can be seen by the thicker arrow 5 in the drawing, the plasma gas is rotating. The lances 4 are arranged substantially tangentially so that the material containing carbon and/or hydrocarbon is caused to rotate in the opposite direction, as shown by the arrow 6. Intimate mixing of the additive is thus obtained in the plasma gas and the formation of nitrogen oxide can thus be held at a minimum provided sufficient quantities of the carbonaceous material are added. Examples of suitable carbonaceous materials in this connection are oil, hydrocarbon, coal slurry, coal powder, etc.

Figure 3:
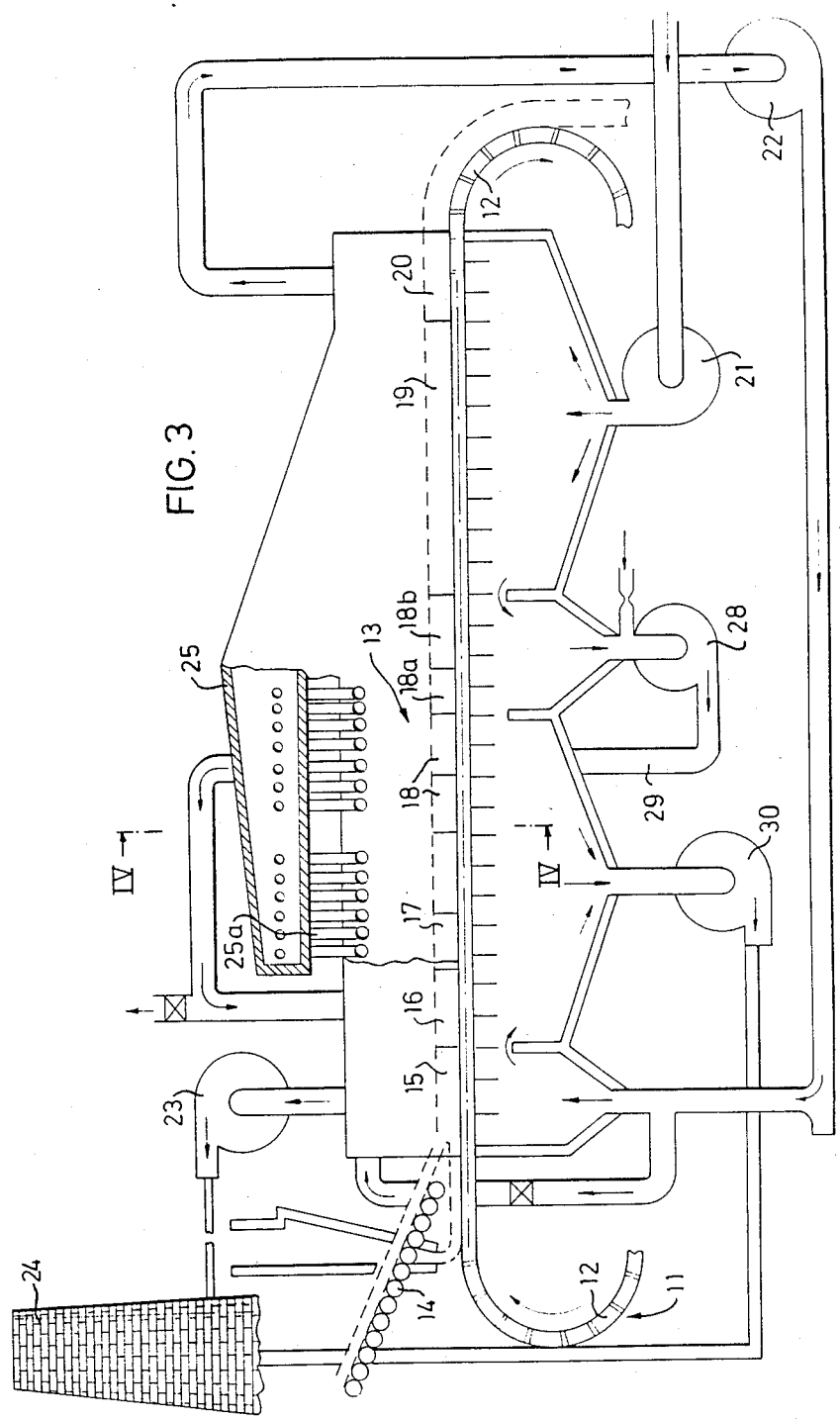
FIG. 3 is a schematic view of a pelletizing plant with straight grate provided with the hot air generation means according to the invention.

FIG. 3 shows the application of the invention in a pelletizing plant with a straight grate kiln. The pelletizing plant shown here is provided with an endless conveyor 11 consisting of a large number of carriages 12 connected together and running on rails, designed for transporting agglomerated iron ore concentrates, known as pellets, through a furnace or kiln 13. The pellets are continuously supplied to the carriages 12 by a roller screen 14. The carriages pass in turn through two drying zones 15, 16, a preheating zone 17, a sintering zone 18 with two post-sintering zones 18a, 18b, and two cooling zones 19, 20. The bottom surfaces of the carriages 12 are permeable to air and may be in the form of grids or nets, for instance.

Air from another part of the process (e.g., cooling air) may be used as process air for the pelletizing plant. The air is supplied by a cooling fan 21 and is first blown into the cooling zones 19, 20. A small portion of the air flows through the last cooling zone 20, is fed by a drying air fan 22 to the first drying zone 15 and flows up through the layer of pellets in the carriages and is withdrawn by a suction fan 23 into a chimney 24. The remaining major portion of the air drawn in is led up into a duct or hood 25, after which it flows down through channels 25a, 25b to the preheating zone 17 and to burners 26 and 27 arranged in the sintering zone. A suitable arrangement may be four pairs of burners in the preheating zone and seven pairs of burners in the sintering zone.

A small portion of the cooling air is caused to flow down through the carriages in the second postsintering zone 18b, so that the sintering process is completed even in the lowermost layers of pellets in the carriages.

A recuperation fan 28 is arranged under the sintering zones 18a, 18b, the air being fed by this fan through a pipe 29 to the second drying zone 16. After passing through the carriages filled with pellets, it is then blown out through the chimney, together with the air from the sintering zone, by an exhaust fan.

If the method according to the invention is applied in such a pelletizing plant, six of the pairs of burners in the sintering zone are preferably replaced by plasma generators designed in accordance with FIGS. 1 and 2, to achieve the necessary heating of the air without the formation of nitrogen oxide. The atomizing air normally used for the oil burners provides sufficient air for the use of the plasma generators according to the invention. No further modification of the process or apparatus, such as installation of additional fans or compressors, is required. Therefore, if the process air heating is performed in the pelletizing plant in the manner proposed by the invention, only the installation of the plasma burners and the electrical equipment associated therewith is necessary.

FIG. 4 shows a cross-section through the apparatus in FIG. 3 along the line IV—IV passing through the sintering zone. It can be seen that the carriages 12 have wheels 31 running on rails 32. The air, heated to about 900° C., flows from the hood 25 down through the channels 25a and 25b to the vicinity of the burners 26 and 27, where it is heated and then enters the furnace area 33 and passes down through the carriages filled with pellets. FIG. 4 thus shows an arrangement with the plasma generators in accordance with the invention as shown in FIG. 1. The function of the plant will become clearer when referring to the example described below.

It will be appreciated by those skilled in the art that the embodiment described herein is only one of many feasible technical applications of the present novel method and apparatus for solving the problem of the formation of nitrogen oxide in a plasma generator.

The invention will now be further illustrated by means of the following example, with reference to the pelletizing plant shown schematically in FIGS. 3 and 4.

EXAMPLE

Production in the pelletizing plant is assumed to be 420 ton pellets/hour. Air already used in the process, with a temperature of about 900° C., is used as inlet air. A temperature of 1300° C. is required, as known, for the actual sintering process. However, the pellets entering must not be subjected to a sudden temperature increase to 1300° C. The plant is therefore designed, as is clear from the detailed description above, to use a drying air with a temperature of about 250° C. in a first drying zone, whereupon the air temperature is gradually increased in the following preheating zones. Post-sintering zones are arranged after the sintering zones. This is necessary to give the pellets at the bottom time to sinter. It is thus in the actual sintering zone that the prior oil burners should be replaced by the plasma generators proposed according to the invention.

With the production capacity mentioned above, extra power amounting to 39 MW is required, corresponding to 3.4 ton oil/hour, to heat approximately 70,000 $Nm^3$ air/hour. According to the invention, the plasma gas generated in the plasma burner must be provided with sufficient material containing carbon and/or hydrocarbon to prevent the formation of nitrogen oxide, the ratio $CO+H_2/CO_2+H_2O$ being greater than 0.1 after the reaction. It has been found that above 25% of the heat supplied derives from the reaction of the carbonaceous material and the remaining 75% of the heat supplied is obtained from electric energy.

The conveyor furnace in the example has eleven pairs of burners, seven located in the sintering zone. In this application of the invention, six of the latter burner pairs are preferably replaced by six plasma generators connected in pairs. Normally, the atomizing air already introduced for the oil combustion is sufficient to supply the plasma generators with air. The first air-flow portion passing through the plasma generators to produce the plasma gas generally constitutes only about 10% of the process air finally obtained, which is used for the sintering. This first air-flow portion may preferably have the prevailing ambient temperature as it enters the plasma generators.

Surprisingly, the formation of nitrogen oxides can also be effectively avoided by heating the process air with a plasma gas formed by passing a small stream of a gas such as steam that is substantially devoid of any free oxygen and nitrogen through plasma burner means. This requires only that steam be supplied to the inlet duct 2 (FIG. 1). No carbon and/or hydrocarbon containing material need be fed into the tuyere 3 through the lances 4, unless it is desired to supplement the heat generated electrically by combustion of such material. Since the temperature of the air in the mixing zone never has time to rise above the critical temperature where oxygen and nitrogen radicals form, i.e. about 2000°–3000° C., and since no combustion occurs during the mixture of the plasma gas with the process air flow, no nitrogen oxides are formed.

Thus, a plasma gas can be used according to the invention for heating a process air flow without the necessity for adding material to avoid the formation of nitrogen oxides. The use of steam as a medium for energy conversion has many advantages, e.g. it is readily available in existing plants and is relatively cheap.

A desired or even necessary feature for the successful process development in plants requiring such high capital investments as pelletizing plants is that any improvements can be effected with the least possible interference in the existing equipment. This is achieved in the present case where only the oil burner unit has to be replaced by the plasma generators, together with associated electrical equipment and some minor accessories.

While the power requirement is substantially the same with the use of plasma or oil burners, the efficiency of the plasma burner is higher than that of the oil burner. Even more important, fossil fuels, for which the prices have increased extremely rapidly, can be replaced by considerably less expensive electric power by means of the invention.

We claim:

1. A method of heating process air for industrial purposes to a predetermined temperature comprising generating a plasma gas stream by passing a first air-flow portion through a plasma generator means and thus heating said portion to a temperature sufficiently high to cause ionization of nitrogen and oxygen in the portion and thus form a plasma gas, immediately thereafter adding to said plasma gas a material containing carbon and/or hydrocarbon in sufficient quantity that when said material is reacted with the plasma gas the ratio $CO+H_2/CO_2+H_2O$ is at least 0.1, thereby substantially avoiding the formation of nitrogen oxide, and immediately thereafter mixing with the plasma gas stream an air flow in such proportion that the predetermined temperature is achieved in the final mixture and that the formation of nitrogen oxides in said final mixture is thereby avoided.

2. A method according to claim 1 wherein the plasma gas is caused to rotate as it leaves the plasma gas generator means, and including the step of injecting the material containing carbon and/or hydrocarbon into the plasma gas in such a way that said material acquires a direction of rotation counter to that of the plasma gas.

3. A method according to either of claim 1 or 2 wherein the second air-flow portion is supplied to a reaction zone formed immediately after the point where the material containing carbon and/or hydrocarbon is injected into the plasma gas.

* * * * *